United States Patent
Gedevanishvili et al.

(10) Patent No.: US 8,202,589 B2
(45) Date of Patent: Jun. 19, 2012

(54) ORAL DELIVERY POUCH PRODUCT WITH COATED SEAM

(75) Inventors: Shalva Gedevanishvili, Richmond, VA (US); Paolo Catasti, Richmond, VA (US); Danielle R. Crawford, Chester, VA (US); William R. Sweeney, Richmond, VA (US); Munmaya K. Mishra, Richmond, VA (US); Shengsheng Liu, Richmond, VA (US)

(73) Assignee: Philip Morris USA Inc., Richmond, VA (US)

(*) Notice: Subject to any disclaimer, the term of this patent is extended or adjusted under 35 U.S.C. 154(b) by 932 days.

(21) Appl. No.: 12/219,116

(22) Filed: Jul. 16, 2008

(65) Prior Publication Data

US 2009/0022917 A1    Jan. 22, 2009

Related U.S. Application Data

(60) Provisional application No. 60/929,877, filed on Jul. 16, 2007.

(51) Int. Cl.
*B29D 22/00* (2006.01)
*A23G 4/18* (2006.01)
*B65B 29/02* (2006.01)

(52) U.S. Cl. ....... 428/35.2; 131/352; 131/347; 131/359; 131/275; 426/5; 426/77; 426/78; 426/79; 426/106; 426/132

(58) Field of Classification Search .................. 131/194, 131/275, 347, 352, 359; 426/77, 78, 79, 426/80, 81, 82, 83, 84, 106, 132, 5; 428/35.2
See application file for complete search history.

(56) References Cited

U.S. PATENT DOCUMENTS

| | | | |
|---|---|---|---|
| 307,537 | A | 11/1884 | Foulks |
| 1,234,279 | A | 7/1917 | Buchanan |
| 1,376,586 | A | 5/1921 | Schwartz |
| 1,992,152 | A | 2/1935 | Yeates |
| 2,313,696 | A | 3/1941 | Yates |
| 2,306,400 | A | 12/1942 | Menzel |
| 2,330,361 | A | 9/1943 | Howard |
| 2,528,778 | A | 11/1950 | Piazze |
| 3,067,068 | A | 12/1962 | Finberg |
| 3,162,199 | A | 12/1964 | Moll |

(Continued)

FOREIGN PATENT DOCUMENTS

EP    0145499    4/1989

(Continued)

OTHER PUBLICATIONS

International Search Report and Written Opinion mailed Mar. 31, 2009 for PCT/IB2008/002681.

(Continued)

*Primary Examiner* — Rena Dye
*Assistant Examiner* — Lee Sanderson
(74) *Attorney, Agent, or Firm* — Buchanan Ingersoll & Rooney PC

(57) ABSTRACT

Provided is an oral pouch product having a coated seam, having a porous pouch wrapper; an inner filling material enclosed within first and second opposed layers of the porous pouch wrapper; at least one seam holding a portion of said first and second opposed layers of said porous pouch wrapper together; and a first coating comprising a releasable ingredient applied to an outer surface of said seam. Also provided is a method for making the oral pouch product.

17 Claims, 3 Drawing Sheets

U.S. PATENT DOCUMENTS

| | | | |
|---|---|---|---|
| 3,174,889 | A | 3/1965 | Anderson et al. |
| 3,607,299 | A | 9/1971 | Bolt |
| 3,692,536 | A | 9/1972 | Fant |
| 3,757,798 | A | 9/1973 | Lambert |
| 3,846,569 | A | 11/1974 | Kaplan |
| 4,703,765 | A | 11/1987 | Paules et al. |
| 5,127,208 | A | 7/1992 | Custer et al. |
| 5,167,244 | A * | 12/1992 | Kjerstad ............ 131/359 |
| 5,174,088 | A | 12/1992 | Focke et al. |
| 5,346,734 | A | 9/1994 | Wydick, Jr. |
| 6,143,316 | A | 11/2000 | Hayden et al. |
| 6,146,655 | A | 11/2000 | Ruben |
| 6,162,516 | A | 12/2000 | Derr |
| D489,606 | S | 5/2004 | Lofman |
| 7,090,858 | B2 | 8/2006 | Jayaraman |
| D568,576 | S | 5/2008 | Neidle et al. |
| D585,626 | S | 2/2009 | Chappell, Sr. et al. |
| 2003/0224090 | A1 | 12/2003 | Pearce et al. |
| 2004/0018293 | A1 | 1/2004 | Popplewell et al. |
| 2004/0037879 | A1 | 2/2004 | Adusumilli et al. |
| 2004/0118421 | A1 | 6/2004 | Hodin et al. |
| 2004/0123873 | A1 | 7/2004 | Calandro et al. |
| 2004/0191322 | A1 | 9/2004 | Hansson |
| 2004/0247649 | A1 | 12/2004 | Pearce et al. |
| 2004/0247744 | A1 | 12/2004 | Pearce et al. |
| 2004/0247746 | A1 | 12/2004 | Pearce et al. |
| 2005/0003048 | A1 | 1/2005 | Pearce et al. |
| 2005/0061339 | A1 | 3/2005 | Hansson et al. |
| 2005/0100640 | A1 | 5/2005 | Pearce |
| 2005/0210615 | A1 | 9/2005 | Shastry et al. |
| 2005/0244521 | A1 | 11/2005 | Strickland et al. |
| 2006/0073190 | A1 | 4/2006 | Carroll et al. |
| 2006/0118589 | A1 | 6/2006 | Arnarp et al. |
| 2006/0191548 | A1 | 8/2006 | Strickland et al. |
| 2006/0204598 | A1 | 9/2006 | Thompson |
| 2006/0228431 | A1 | 10/2006 | Eben et al. |
| 2007/0000505 | A1 | 1/2007 | Zhuang et al. |
| 2007/0012328 | A1 | 1/2007 | Winterson et al. |
| 2007/0062549 | A1 | 3/2007 | Holton, Jr. et al. |
| 2007/0095356 | A1 | 5/2007 | Winterson et al. |
| 2007/0107747 | A1 | 5/2007 | Hill et al. |
| 2007/0122526 | A1 | 5/2007 | Sweeney et al. |
| 2007/0186941 | A1 | 8/2007 | Holton, Jr. et al. |
| 2007/0186942 | A1 | 8/2007 | Strickland et al. |
| 2007/0186943 | A1 | 8/2007 | Strickland et al. |
| 2007/0186944 | A1 | 8/2007 | Strickland et al. |
| 2007/0190157 | A1 * | 8/2007 | Sanghvi et al. ............ 424/489 |
| 2007/0207239 | A1 | 9/2007 | Neidle et al. |
| 2007/0261707 | A1 | 11/2007 | Winterson et al. |
| 2007/0267033 | A1 | 11/2007 | Mishra et al. |
| 2008/0029110 | A1 | 2/2008 | Dube et al. |
| 2008/0029116 | A1 | 2/2008 | Robinson et al. |
| 2008/0029117 | A1 | 2/2008 | Mua et al. |
| 2008/0081071 | A1 | 4/2008 | Sanghvi et al. |
| 2008/0166395 | A1 | 7/2008 | Roush |
| 2008/0173317 | A1 | 7/2008 | Robinson et al. |
| 2008/0196730 | A1 | 8/2008 | Engstrom et al. |
| 2008/0202536 | A1 | 8/2008 | Torrence et al. |
| 2008/0302682 | A1 | 12/2008 | Engstrom et al. |
| 2008/0308115 | A1 | 12/2008 | Zimmermann et al. |
| 2008/0317911 | A1 | 12/2008 | Schleef et al. |
| 2009/0004329 | A1 | 1/2009 | Gedevanishvili et al. |
| 2009/0022856 | A1 | 1/2009 | Cheng et al. |
| 2009/0025738 | A1 | 1/2009 | Mua et al. |
| 2009/0025739 | A1 | 1/2009 | Brinkley et al. |
| 2009/0025740 | A1 | 1/2009 | Chappell, Sr. et al. |
| 2009/0025741 | A1 | 1/2009 | Crawford et al. |
| 2009/0035414 | A1 | 2/2009 | Cheng et al. |
| 2009/0126746 | A1 | 5/2009 | Strickland et al. |
| 2010/0218779 | A1 | 9/2010 | Zhuang et al. |
| 2010/0300464 | A1 | 12/2010 | Gee et al. |
| 2010/0300465 | A1 | 12/2010 | Zimmermann |
| 2011/0083680 | A1 | 4/2011 | Mishra et al. |
| 2011/0180087 | A1 | 7/2011 | Gee et al. |
| 2011/0236442 | A1 | 9/2011 | Miser et al. |

FOREIGN PATENT DOCUMENTS

| | | |
|---|---|---|
| EP | 0483500 A1 | 5/1992 |
| EP | 0 422 898 | 9/1994 |
| EP | 0 599 425 | 10/1997 |
| GB | 1350740 | 4/1974 |
| JP | 03-240665 | 10/1991 |
| WO | WO 94/25356 | 11/1994 |
| WO | WO 97/45336 | 12/1997 |
| WO | WO 01/70591 A1 | 9/2001 |
| WO | WO 03/028492 A1 | 4/2003 |
| WO | WO 2004/009445 | 1/2004 |
| WO | WO 2004/052335 | 6/2004 |
| WO | WO 2004/056219 | 7/2004 |
| WO | WO 2004/058217 | 7/2004 |
| WO | WO 2004/064811 A1 | 8/2004 |
| WO | WO 2004/066986 | 8/2004 |
| WO | WO 2004/095959 A1 | 11/2004 |
| WO | WO 2005/027815 | 3/2005 |
| WO | WO 2005/046363 A | 5/2005 |
| WO | WO 2005/077232 | 8/2005 |
| WO | WO 2005/084446 | 9/2005 |
| WO | WO 2006/004480 | 1/2006 |
| WO | WO2006/039487 A | 4/2006 |
| WO | WO 2006/065192 | 6/2006 |
| WO | WO 2006/090290 A | 8/2006 |
| WO | WO 2006/105173 | 10/2006 |
| WO | WO 2006/120570 | 11/2006 |
| WO | WO2006/127772 A | 11/2006 |
| WO | WO 2007/037962 | 4/2007 |
| WO | WO2007/057789 A | 5/2007 |
| WO | WO 2007/057791 A2 | 5/2007 |
| WO | WO 2007/082599 A1 | 7/2007 |
| WO | WO 2007/104573 | 9/2007 |
| WO | WO 2007/126361 A1 | 11/2007 |
| WO | WO 2008/016520 A2 | 2/2008 |
| WO | WO2008/042331 A | 4/2008 |
| WO | WO 2008/104891 A2 | 9/2008 |
| WO | WO 2008/140372 A1 | 11/2008 |

OTHER PUBLICATIONS

International Preliminary Report on Patentability issued Jan. 19, 2010 for PCT/IB2008/002681.

Satel, Sally M.D., "A Smokeless Alternative to Quitting," Apr. 6, 2004, The New York Times, Accessed Oct. 25, 2010; http://query.nytimes.com/gst/fullpage.html?res=9402EFD91E39F935A35757COA9629C8B63.

* cited by examiner

ORAL DELIVERY POUCH PRODUCT WITH COATED SEAM

CROSS-REFERENCE TO RELATED APPLICATIONS

This application claims priority under 35 U.S.C. 119 to U.S. Provisional Application No. 60/929,877 entitled ORAL DELIVERY POUCH PRODUCT WITH COATED SEAM and filed on Jul. 16, 2007, the entire content of which is hereby incorporated by reference.

SUMMARY

In one embodiment, an oral pouch product having a coated seam is provided. The oral pouch produced comprises a porous pouch wrapper; an inner filling material enclosed within first and second opposed layers of the porous pouch wrapper; at least one seam holding a portion of said first and second opposed layers of said porous pouch wrapper together; a first coating comprising a releasable ingredient applied to an outer surface of said seam.

In another embodiment, a method of making an oral pouch product having a coated seam is provided. A sealed oral pouch product is obtained comprising, a porous pouch wrapper; an inner filling material enclosed within opposed layers of the porous pouch wrapper; at least one seam holding a portion of said opposed layers of said porous pouch wrapper together; and applying a coating mixture comprising a releasable ingredient to an outer surface of said seam.

DETAILED DESCRIPTION

Figure 1:
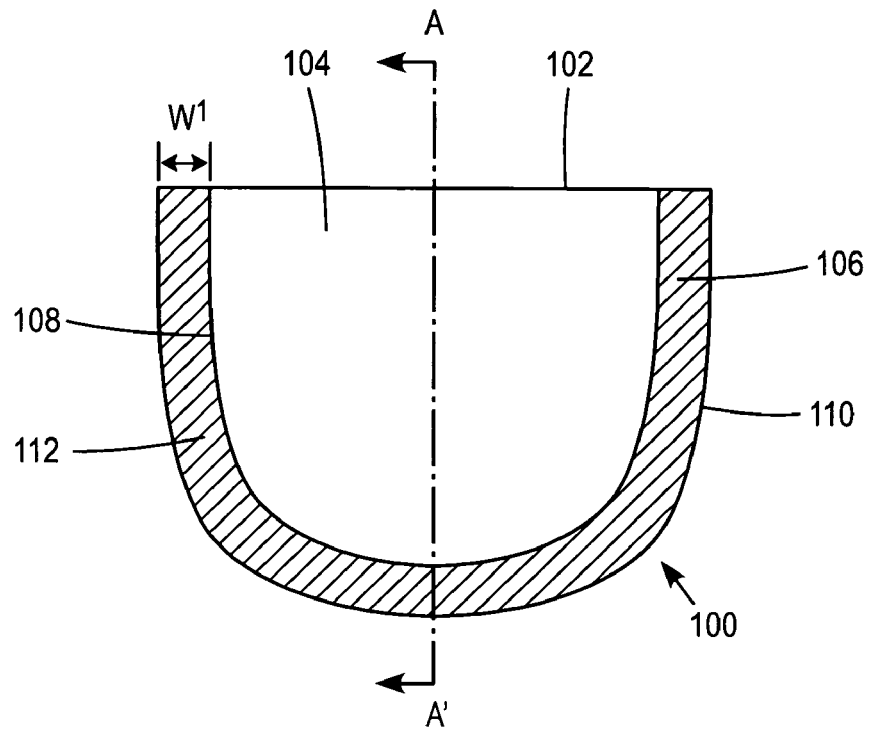
FIG. 1 is a schematic plan view of one embodiment of an oral pouch product as disclosed herein.

As used herein, the term "about" can be reasonably appreciated by a person skilled in the art to denote somewhat above or somewhat below the stated numerical value, to within a range of ±10%.

Described herein is an oral pouch product for the delivery of an engaging, flavorful, aromatic, energizing, and/or soothing experience by delivering ingredients to a user in a consumable unit designed to be inserted in the mouth. At least some of these ingredients are provided by an inner filling material, which can include materials such as fibers of tobacco or botanicals, such as tea, capsules, beads, powders, granules, extracts, such as tea or tobacco extracts, or other materials, such as food grade materials. The filling material is enclosed in a porous pouch wrapper between opposed layers of the pouch wrapper, which are held together by at least one seam, such as a heat or adhesive seal. At least some other ingredients are contained in one or more coatings disposed on the outer surface of the pouch wrapper at the seam. This provides for a more productive, functional use of the seam, and can modify the flavor delivery profile, texture, flavor duration, flavor direction, and function of the oral pouch product.

In a particular embodiment, the inner filling material completely fills the interior of the porous pouch wrapper. In another embodiment, the inner filling material partially fills the interior of the porous pouch wrapper.

Preferably, the oral pouch product is sized and configured to fit comfortably in a user's mouth, and has maximum dimensions of about 0.1 inches to about 2.0 inches. It will be recognized that while FIGS. 1 through 5, described below, illustrate a half-moon or D-shaped oral pouch product, other shapes are possible for the oral pouch products described herein, including, without limitation a sphere, rectangle, square, oval, pouch-shape, crescent, rod-shape, or oblong, cylindrical, tea leaf, tear drop, or hourglass shapes. In some embodiments, the pouch-shape can be similar to a ravioli or pillow shape. Other shapes may be utilized so long as the shapes fit comfortably and discreetly in a user's mouth. In some embodiments, the shape of the pouch can indicate the releasable ingredient, such as the flavor. Thus, in these embodiments, the pouch may be shaped as fruits, vegetables, or other objects that connote a particular releasable ingredient. For instance, the pouch could be in the shape of a banana to indicate a banana flavor.

Preferably, the oral pouch product delivers a plurality of flavor and/or functional ingredients to the user for a period of about one minute to about 1 hour. Preferably, the pouch is discarded after a single use. Preferably, the oral pouch product weighs between about 0.2 g and 5.0 g. The weight is predominately the result of the weight of the enclosed inner filling material.

The porous pouch wrapper described herein can be made of a porous material, such as a paper or fabric, such as a nonwoven fabric or a paper of the type used to construct filters or tea bags. The porous pouch wrapper should be capable of allowing the flavors and functional ingredients contained in the inner filling material of the oral pouch product to diffuse through the pouch wrapper and into the user's mouth. The porous pouch wrapper should also be capable of accepting the coating material as described herein. If desired, the porous pouch wrapper can be made from a material suitable for contact with food. Preferred porous materials include, but are not limited to, films, gelatin, food casings, carrageenan, biopolymers, fabric and/or paper such as filter paper, papers used to construct tea bags, coffee filters, and the like.

The inner filling material described herein can include botanical fibers, powders, extracts, capsules, microcapsules, beads, granules, liquids, semi-liquids, gels, and other food grade materials. These materials can form part of a matrix that is held together as a pliable mass by a binder. The inner filling material can be a tobacco containing or tobacco-free filling, and preferably includes sweeteners, flavorants, coloring agents, functional ingredients, and the like. The inner filling material can be in the form of particles, capsules, microcapsules, beads, granules, or fibers, or can be in the form of a monolithic solid mass.

If a binder is present in the inner filling material, it is preferably a food grade adhesive, gum or other binder. Suitable binders include, without limitation, sodium alginate, sugar, agar, guar gum, and the like. In a preferred embodiment, the binder is added in an effective amount such as about 10% to about 60% by weight of the oral pouch product.

The inner filling material can include functional ingredients such as, without limitation, chemesthesis agents, antioxidants, vitamins, soothing agents, energizing agents and the like. In a preferred embodiment, the soothing agents include, without limitation, chamomile, lavender, jasmine, and the like. Preferably, the energizing ingredients or vitamins include, without limitation, caffeine, taurine, guarana, vitamin B6, vitamin B12, and the like. Suitable chemesthesis ingredients provide, without limitation, hot, spicy, or cooling flavors such as mint, menthol, cinnamon, pepper, and the like. Suitable antioxidants include glutathione, ascorbic acid, tocopherol, flavonoids, carotenoids, and the like. Combinations of two or more of the above functional ingredients can be included.

Preferably the inner filling material contains one or more flavorants. Exemplary suitable flavorants include, but are not limited to, berry flavors such as pomegranate, acai, raspberry, blueberry, strawberry, boysenberry, and/or cranberry. Other suitable flavorants include, without limitation, any natural or synthetic flavor or aroma, such as menthol, peppermint, spearmint, wintergreen, bourbon, scotch, whiskey, cognac, hydrangea, lavender, chocolate, licorice, citrus and other fruit flavors, such as apple, peach, pear, cherry, plum, orange, lime, grape, and grapefruit, gamma octalactone, vanillin, ethyl vanillin, breath freshener flavors, butter, rum, coconut, almond, pecan, walnut, hazelnut, french vanilla, macadamia, sugar cane, maple, cassis, caramel, banana, malt, espresso, kahlua, white chocolate, spice flavors such as cinnamon, clove, cilantro, basil, oregano, garlic, mustard, nutmeg, rosemary, thyme, tarragon, dill, sage, anise, and fennel, methyl salicylate, linalool, jasmine, coffee, olive oil, sesame oil, sunflower oil, bergamot oil, geranium oil, lemon oil, ginger oil, balsamic vinegar, rice wine vinegar, and red wine vinegar.

In a preferred embodiment, the inner filling material can also include tobacco particles, particles of tobacco substitutes, tobacco extract, non-tobacco botanical components, such as tea and tea extracts, coffee, coffee extracts, vegetables, vegetable extracts, and/or herbs and herb extracts, and combinations of these.

The inner filling material can also include one or more powdered components to provide an additional layer of texture and/or flavor. Preferably, the powdered component is selected from, without limitation, dry sour cream, powdered sugar, powdered cocoa, powdered spices, and/or powdered herbs and other botanicals such as tea and/or tea extracts.

The inner filling material can also include a viscous substance. In a preferred embodiment, the viscous substance is selected from substances such as honey, molasses, syrups, and the like.

The inner filling material can include natural or artificial sweeteners; preferred sweeteners include, without limitation, water soluble sweeteners such as monosaccharides, disaccharides, and polysaccharides such as xylose, ribose, sucrose, maltose, fructose, glucose, and mannose. In a particular embodiment, sugar alcohols, such as xylitol, mannitol, or sorbitol can be included. In another particular embodiment, sucralose can be included.

If capsules, microcapsules, and/or beads are included in the oral pouch product, they can preferably contain one or more of the flavorants, coloring agents, functional ingredients, and the like present in the inner filling material. The capsules, microcapsules and/or beads can have various sizes, and can be included in amounts of about 2 to about 40 capsules, microcapsules, and/or beads, depending on the size of the final product and the size of the capsules, microcapsules, and/or beads. Preferably, the capsules, microcapsules, and/or beads range in size from about 0.1 mm to about 8 mm depending on the ingredients contained therein. The capsules, microcapsules, and/or beads can have shells of varying thicknesses. Varying the thicknesses of the shells of the capsules, microcapsules, and/or beads included in the oral pouch product allows for the ingredients contained in each of the capsules, microcapsules, and/or beads to be released at varying rates, which can prolong the flavor and/or functional experience. Preferably, the shells range in thickness from about 0.1 mm to about 7 mm, depending on the size of the capsules, microcapsules, and/or beads and the preferred dissolution rate. Preferably, the capsules, microcapsules, and/or beads having the thinnest shells dissolve first to release the enclosed flavors and functional ingredients. Capsules, microcapsules, and/or beads having thicker shells dissolve at a slower rate to provide continued and longer lasting release of the flavor and functional ingredients contained therein. The ingredients of the capsules, microcapsules, and/or beads can be released by mastication, sucking, moisture, pH change, and the like. Each of the capsules, microcapsules, and/or beads included in the oral pouch product may have the same or a different release mechanism or release rate, which can aid in varying the release rate of the capsules, microcapsules, and/or beads.

The seam holding the opposing layers of the porous pouch wrapper together can be formed by heat sealing the material of the opposing layers of the porous pouch wrapper together. Alternatively, the seam can be formed by adhering the opposing layers together using an adhesive, such as a food-grade adhesive.

The releasable ingredient applied as a coating to the seam as described herein can include the flavorants, functional ingredients, sweeteners, tobacco or non-tobacco botanical components, powdered components, viscous substances, and combinations of these, as are described above for inclusion in the inner filling material, provided that these materials are susceptible of application as a coating to the seam. Preferably the releasable ingredient contains a flavorant or functional ingredient, such as an energizing or soothing agent, which can be quickly released from the coating upon placement of the oral pouch product into the user's mouth, or which supplement or complement the flavorant or functional materials released from the inner filling material, or both. The user thus can experience a burst of flavor or energizing or soothing agent while the inner filling material is releasing material through the pores of the pouch wrapper.

Release of the releasable material can result from dissolution or disintegration of the coating material in saliva, leaching of the releasable material from the coating into the saliva, mastication or other mechanical manipulation of the oral pouch product and/or the coating in the mouth of the user, which may disintegrate the coating or otherwise cause release of the releasable material, or by some combination of these mechanisms.

The coating may contain multiple layers, each of which may contain the same or different releasable ingredients, and each of which may have the same or different thicknesses and/or provide the same or different release rates for the releasable ingredient. A single coating may be applied to one of the sides of the seam, or two coatings may be applied, one to each side of the seam. The two coatings may contain the same or different releasable ingredients, may have the same or different thicknesses, and may have the same or different areas.

The coating may be rigid or elastic, and may be frangible or chewable, depending on the type of oral pouch product desired; the consistency of the coating may be varied with the type of releasable ingredient contained therein. The coating may contain one or more binders or matrix-forming materials such as microcrystalline cellulose (MCC), carboxymethylcellulose (CMC), starch, carrageenan, β-cyclodextrin, gum base, gelatin, and the like, which can help to immobilize the releasable ingredient, give the desired texture to the coating, and preferably control the release rate thereof. The coating may also contain hydrocolloids, biopolymers, food grade polymers, and combinations of these. The polymers may be non-crosslinkable, or crosslinkable by, e.g., metal ions. Non-limiting examples of non-crosslinkable polymers include starch, dextrin, gum arabic, guar gum, chitosan, cellulose, polyvinyl alcohol, polylactide, gelatin, soy protein, whey protein, and combinations thereof. Non-limiting examples of crosslinkable polymers include alginate, pectin, carrageenan, polysaccharides modified with cross-linkable groups, and combinations thereof. Crosslinkable polymers in the coating can be crosslinked after application by contacting with an appropriate crosslinking agent. The coating may be in the form of, or may contain, botanical fibers, powders, extracts, capsules, microcapsules, beads, granules, liquids, semi-liquids, gels, or combinations thereof. Preferably the coating is in the form of a solid film. Multiple coatings can be applied.

Desirably, the coating covers some or all of the area of the seam, up to about 2 cm$^2$. The thickness of the coating may range between about 0.5% and about 25% of the thickness of the oral pouch product. The coating can provide an initial burst of releasable ingredient, such as an initial flavor burst, upon placement into the user's mouth.

The oral pouch products described herein can be made by first assembling and sealing the uncoated pouch product, and then applying a coating mixture containing a releasable ingredient to one or both outer surfaces of the seam by dipping, spraying, painting, or otherwise applying a coating liquid or paste containing the releasable ingredient to the area to be coated at the seam.

The coating mixture may be applied to the seam as a solution, suspension, emulsion, slurry, or paste of the releasable ingredient, typically in a solvent, such as water. The slurry may contain binders or matrix forming materials as described herein. Preferably, the coating mixture is dried to remove excess solvent, such as water, to form a solid film.

For example, assembling and sealing the pouch product can be accomplished by forming a porous wrapper into an open pouch using a vertical fill machine and filling the open pouch with an inner filling material. The pouch is then sealed to contain the inner filling material by one of the methods described above, to form an oral pouch product. Preferably, a series of pouches are formed with or without a space between seams of adjacent pouches and then cut apart to form individual pouch products. For instance, the pouch product may be cut with a die at a location between adjacent seams or along a single seam.

Alternatively, a first strip of pouch wrapper material can be advanced along a feed path, filling material in matrix form can be placed on the strip, a second strip can be placed over the first strip, a sealing die can be used to press the strips together and form a seam such as a heat seal or adhesive seal around the filling, and a cutting die can be used to cut the first and second strips.

One example of a method for obtaining sealed oral pouch products is disclosed in U.S. Patent Application Publication No. 2007/0122526, the entire contents of which are incorporated herein by reference.

By applying the coating to the seam after it has formed, rather than to the porous pouch wrapper prior to formation of the seam, more productive use can be made of the seam area while controlling any loss of porosity or decrease in the release characteristics of the porous pouch wrapper. Extension of the coating to the portion of the porous pouch wrapper adjacent to the seam can provide additional releasable ingredient to the user while controlling any blockage of the pores of the pouch wrapper that might result.

The oral pouch products described herein can be better understood by reference to the accompanying drawings, which illustrate exemplary, non-limiting embodiments of the oral pouch product.

FIG. 1 shows a schematic plan view of one embodiment of the oral pouch product 100 disclosed herein. The oral pouch product 100 contains a porous pouch wrapper 102 having opposing layers, in which first opposed layer 104 is shown in FIG. 1. The other opposing layer is beneath first opposed layer 104 and therefore not visible in FIG. 1. The opposing layers are held together by at least one seam 106. As illustrated, seam 106 extends from the inside seam edge 108 to the outer seam edge 110 of the oral pouch product 100, and has a width $w^1$.

It will be recognized that seam 106 having shorter widths that do not extend to the edge of the pouch product, but instead have an outer seam edge 110 that is inside the edge of the oral pouch product 100, are also possible. In addition, it will be recognized that widths that vary along the seam length are also possible.

The area of the seam 106 indicated by the hatched region of the porous pouch wrapper 102 is covered by a first coating 112 containing a releasable ingredient. As illustrated, first coating 112 extends over the entire length and width of seam 106. It will be recognized that, while this may be advantageous in increasing utilization of the seam 106 for delivery of releasable ingredients, oral pouch products having first coatings that extend over only a portion of the length, or width, or both, of seam 106 are also possible. Similarly, oral pouch products where the width of the coating varies along the length of the coating, including coatings that are not continuous along the seam 106, are also possible.

Figure 2:
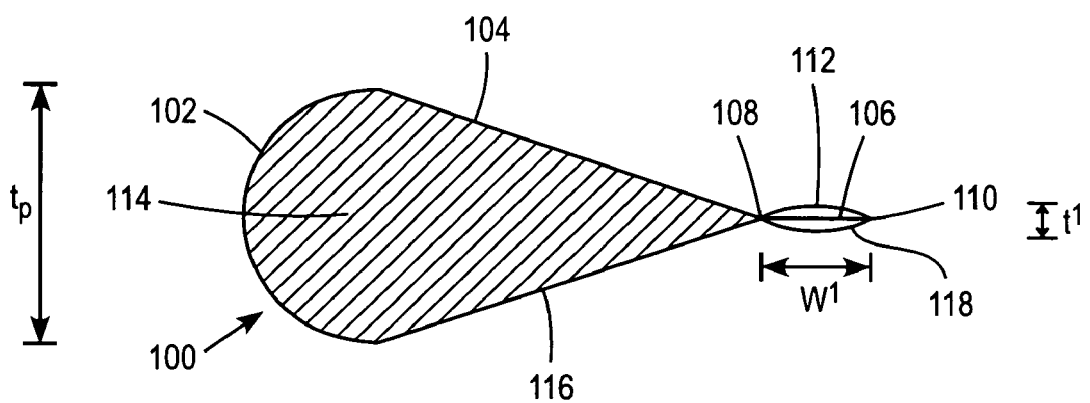
FIG. 2 is a schematic sectional view of one embodiment of the oral pouch product shown in FIG. 1, taken along section line A-A'.

FIG. 2 shows a schematic sectional view of one embodiment of the oral pouch product 100 shown in FIG. 1, also taken along section line A-A'. In this view, the second opposing layer 116 of the porous pouch wrapper 102 can be seen, as can the inner filling material 114 of the oral pouch product 100. In this embodiment, a second coating 118 is shown disposed on second opposed layer 116 at seam 106. It will be recognized that, while the use of first coating 112 and second coating 118 may be advantageous in increasing utilization of the seam 106 for delivery of releasable ingredients, oral pouch products having only a first coating 112 are also possible. The combined thicknesses of first coating 112 and second coating 118 is shown in FIG. 1 as $t^1$, wherein both coatings have approximately the same, relatively small thicknesses.

Figure 3:
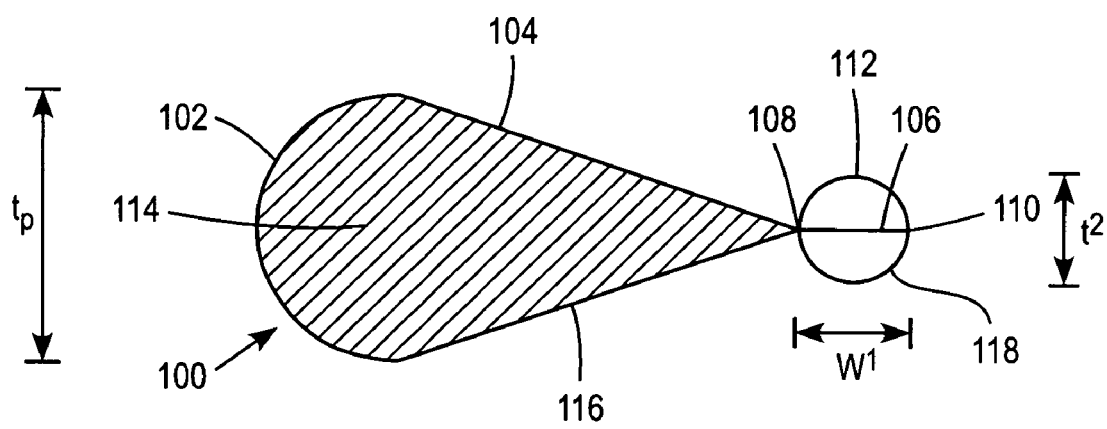
FIG. 3 is a schematic sectional view of another embodiment of the oral pouch product shown in FIG. 1, taken along section line A-A'.

It will be recognized that coating thicknesses different from $t^1$ are also possible, as shown in FIG. 3, wherein thickness $t^2$ is larger relative to the cross sectional thickness of the oral pouch product 100, $t_p$.

Figure 4:
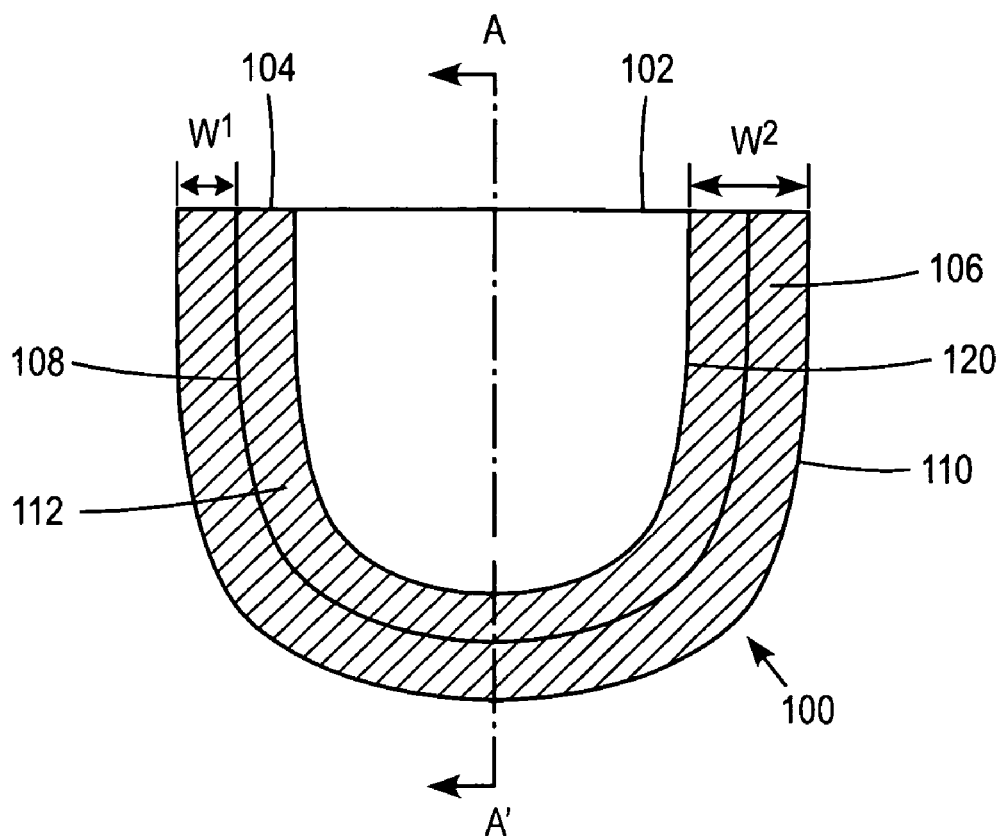
FIG. 4 is a schematic plan view of another embodiment of an oral pouch product as disclosed herein.

FIG. 4 shows a schematic plan view of another embodiment of the oral pouch product 100 disclosed herein, wherein the area occupied by first coating 112 extends past the area of seam 106. As illustrated, the inner coating edge 120 of first coating 112 is located inward of inside seam edge 108 of seam 106, so that the width of first coating 112, $w_2$, is greater than the width of seam 106, $w^1$, and the first coating 112 covers a portion of the porous pouch wrapper 102 adjacent to seam 106. The width $w_2$ may range from about 101% to about 300% of $w_1$, more particularly, from about 150% to about 200% of $w^1$. As with the embodiment shown in FIG. 1, coatings that vary in width along their length, or that are not continuous along their length, are also possible.

Figure 5:
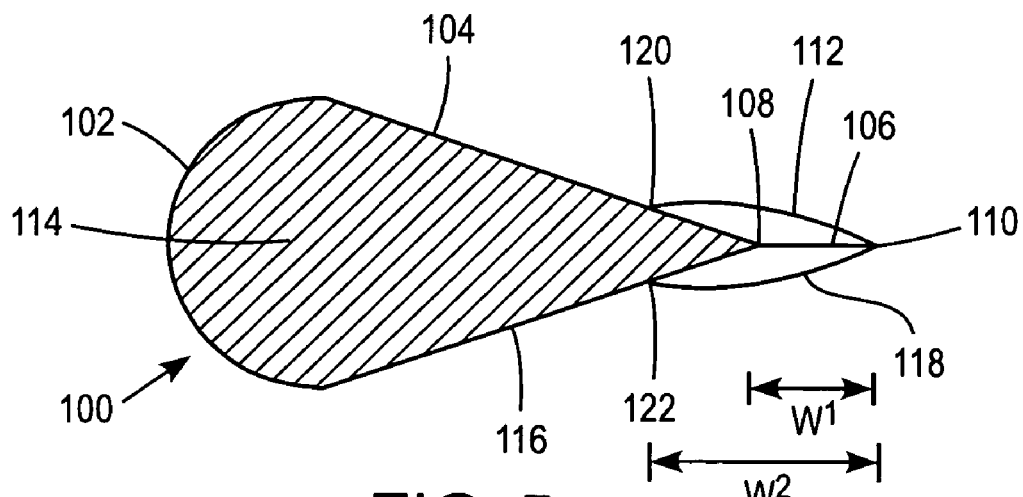
FIG. 5 is a schematic sectional view of the oral pouch product shown in FIG. 4, taken along section line A-A'.

FIG. 5 shows a schematic sectional view of one embodiment of the oral pouch product 100 taken along section line A-A' of FIG. 4. The inner coating edges 120, 122 of first coating 112 and second coatings 118, respectively, are located inward of inside seam edge 108 of seam 106. As illustrated, the width of first coating 112 and second coating 118 are the same, $w^2$. It will be recognized that oral pouch products wherein the widths, thicknesses, and lengths of first coating 112 are not the same as those of second coating 118 are also possible. For example, it is possible for an oral pouch product 100 to have a first coating 112 corresponding in width to the width of seam 106, as shown in FIGS. 1 through 3, while having a second coating 118 having a width that is larger than that of seam 106, as shown in FIGS. 4 and 5.

It will be recognized that FIGS. 1 through 5 illustrate an oral pouch product 100 having a seam 106 along the curved portion of a half-moon or D-shaped pouch. However, seam 106 need not extend around only a portion of the edge of the oral pouch product, but can completely circumscribe it.

While the foregoing has been described in detail with respect to specific embodiments thereof, it will be apparent to those having skill in the art that various changes and modifications may be made, and equivalents thereof be employed, without departing from the scope of the claims.

What is claimed is:

1. An oral pouch product having a coated seam, comprising:
    a porous pouch wrapper;
    an inner filling material enclosed within first and second opposed layers of the porous pouch wrapper;
    at least one seam holding a portion of said first and second opposed layers of said porous pouch wrapper together wherein said seam has a width $W^1$; and
    a first coating comprising a releasable ingredient applied to the outer surface of said seam,
    wherein said first coating does not extend beyond the width of said seam.

2. The oral pouch product of claim 1, wherein said releasable ingredient comprises a flavorant, a functional ingredient, a botanical component, a powdered component, a viscous substance, a sweetener, or a combination of these.

3. The oral pouch product of claim 1, wherein said releasable ingredient is releasable by dissolution or disintegration of said first coating in saliva or by mechanical action in a user's mouth.

4. The oral pouch product of claim 1, wherein said first coating comprises one or more matrix-forming materials selected from the group consisting of microcrystalline cellulose (MCC), carboxymethylcellulose (CMC), starch, gelatin, carrageenan, β-cyclodextrin, gum base, dextrin, gum arabic, guar gum, chitosan, cellulose, polyvinyl alcohol, polylactide, gelatin, soy protein, whey protein, alginate, pectin, crosslinkable polysaccharides, and mixtures thereof.

5. The oral pouch product of claim 1, wherein said first coating is rigid, frangible, elastic, or chewable.

6. The oral pouch product of claim 1, wherein said first coating is in the form of, or contains, botanical fibers, powders, extracts, capsules, microcapsules, beads, granules, liquids, semi-liquids, gels, and mixtures thereof.

7. The oral pouch product of claim 1, wherein said seam has a width ranging between about 1.0 mm and about 4.0 mm.

8. The oral pouch product of claim 7, wherein said first coating is continuous along the length of said seam.

9. The oral pouch product of claim 1, wherein said first coating comprises a plurality of layers.

10. The oral pouch product of claim 9, wherein at least two of said plurality of layers dissolve in saliva at different rates.

11. The oral pouch product of claim 1, wherein said first coating is disposed on said first layer of the porous wrapper and does not extend beyond the width of said seam, and further comprising a second coating comprising a releasable ingredient disposed on said second layer of the porous pouch wrapper and which does not extend beyond the width of said seam.

12. The oral pouch product of claim 11, wherein said first coating and said second coating have different widths, lengths, thicknesses, dissolution rates in saliva, or a combination of these.

13. The oral pouch product of claim 1, wherein said coating covers a surface area of about 0.5 cm$^2$ to about 2 cm$^2$.

14. The oral pouch product of claim 1, wherein said seam and said first coating extend around the periphery of said first opposing layer of said porous pouch wrapper.

15. A method of making the oral pouch product having a coated seam of claim 1, comprising:
    obtaining a sealed oral pouch product comprising:
        a porous pouch wrapper;
        an inner filling material enclosed within opposed layers of the porous pouch wrapper;
        at least one seam holding a portion of said opposed layers of said porous pouch wrapper together wherein said seam having a width $W^1$; and
    applying a coating mixture comprising a releasable ingredient to said seam wherein said coating does not extend beyond the width of said seam.

16. The method of claim 15, wherein said applying said coating mixture comprises placing a solution, suspension, emulsion, slurry, or paste comprising the releasable ingredient on the surface of the porous pouch wrapper at said seam by dipping, spraying, or painting.

17. The method of claim 15, further comprising drying said coating mixture to form a solid film.

* * * * *